US008121344B2

(12) United States Patent
O'Connell et al.

(10) Patent No.: US 8,121,344 B2
(45) Date of Patent: Feb. 21, 2012

(54) SYSTEM AND METHOD FOR ROUTING IMAGED DOCUMENTS

(75) Inventors: John D. O'Connell, Hingham, MA (US); Peter N. Baker, Lafayette, IN (US)

(73) Assignee: Pitney Bowes Inc., Stamford, CT (US)

( * ) Notice: Subject to any disclaimer, the term of this patent is extended or adjusted under 35 U.S.C. 154(b) by 1037 days.

(21) Appl. No.: 11/650,786

(22) Filed: Jan. 8, 2007

(65) Prior Publication Data

US 2007/0110276 A1 May 17, 2007

Related U.S. Application Data

(63) Continuation of application No. 10/249,038, filed on Mar. 11, 2003, now Pat. No. 7,161,108.

(60) Provisional application No. 60/319,987, filed on Mar. 2, 2003.

(51) Int. Cl.
*G06K 9/00* (2006.01)
*B07C 7/00* (2006.01)
*G06F 15/16* (2006.01)
*G06F 15/173* (2006.01)

(52) U.S. Cl. ........ 382/101; 209/900; 209/584; 209/630; 709/202; 709/223; 709/242

(58) Field of Classification Search .................. 382/101; 209/900, 584, 630; 709/202, 223, 242
See application file for complete search history.

(56) References Cited

U.S. PATENT DOCUMENTS

| | | | | |
|---|---|---|---|---|
| 4,205,780 | A * | 6/1980 | Burns et al. | 235/454 |
| 5,031,223 | A * | 7/1991 | Rosenbaum et al. | 382/101 |
| 5,444,794 | A | 8/1995 | Uhland, Sr. | 382/137 |
| 5,794,789 | A | 8/1998 | Payson et al. | 209/549 |
| 6,156,988 | A | 12/2000 | Baker | 209/584 |
| 6,196,393 | B1 * | 3/2001 | Kruk et al. | 209/630 |
| 6,285,777 | B2 | 9/2001 | Kanevsky et al. | 382/101 |
| 6,311,846 | B1 | 11/2001 | Hayduchok et al. | 209/3.3 |
| 6,334,193 | B1 * | 12/2001 | Buzsaki | 714/2 |
| 6,487,302 | B2 | 11/2002 | Foley | 382/102 |
| 6,625,659 | B1 * | 9/2003 | Aramizu et al. | 709/239 |
| 6,721,783 | B1 | 4/2004 | Blossman et al. | 709/206 |
| 6,741,968 | B2 * | 5/2004 | Jacoves et al. | 705/14.23 |
| 2003/0072469 | A1 * | 4/2003 | Alden | 382/101 |
| 2004/0139033 | A1 * | 7/2004 | Amato | 705/400 |
| 2005/0123170 | A1 | 6/2005 | Desprez et al. | 382/101 |

* cited by examiner

*Primary Examiner* — Kathleen Y Dulaney
(74) *Attorney, Agent, or Firm* — George M. Macdonald; Charles R. Malandra, Jr.; Steven J. Shapiro

(57) ABSTRACT

Systems and methods for sorting, scanning and routing imaged documents are described. In one configuration, incoming mixed white mail is sorted and coded, then extracted and scanned using the code to separate items. The separate imaged documents are then routed using the code. In another configuration, the documents are automatically extracted from the envelopes. In yet another configuration, the intended recipient is sent an identifier used to reference the code and retrieve the imaged document.

20 Claims, 4 Drawing Sheets

SYSTEM AND METHOD FOR ROUTING IMAGED DOCUMENTS

CROSS REFERENCE TO RELATED APPLICATIONS

This application is a Divisional of commonly owned, U.S. patent application Ser. No. 10/249,038, filed Mar. 11, 2003 now U.S. Pat. No. 7,161,108, entitled SYSTEM AND METHOD FOR ROUTING IMAGED DOCUMENTS by John D. O'Connell, et al., which is incorporated herein by reference in its entirety.

This application claims priority under 35 U.S.C. section 119(e) from Provisional Patent Application Ser. No. 60/319,987, filed Mar. 2, 2003, entitled System And Method For Routing Imaged Documents, which is incorporated herein by reference in its entirety.

BACKGROUND

The illustrative embodiments described in the present application are useful in systems including those for routing items and more particularly are useful in systems including those for processing, routing and delivering incoming mail as imaged documents in electronic form.

Traditional mail extraction and scanning systems have been described including the Extraction and Scanning System described in U.S. Pat. No. 6,196,393 B1, issued Mar. 6, 2000 to Kruk, Jr., et al. and incorporated by reference herein. In the Kruk system, documents are sequentially opened and scanned before the next document is opened in order to maintain transactional integrity in a single record file. The transaction record files may then be stored as batches. Typical transactional extraction and scanning systems are used for processing check payments. However, the emergence of biochemical and other threats to the mail stream have led to mail digitizing and delivery systems.

Conventional mail scanning and delivery systems utilize a manually operated process requiring that each mail piece be scanned into an electronic image form. Thereafter, an operator decides how to route the document. The operator may manually select the addressee name viewed on the document from an email recipient name database and then initiate a new mail message attaching the electronic image of the mail piece.

SUMMARY

The present application describes illustrative embodiments for routing imaged documents. In one embodiment, incoming mixed white mail is sorted and coded, then extracted and scanned using the code to separate items. In an alternative embodiment, a destination code is preprinted on the mail piece. The separate imaged documents are then routed using the code. In another illustrative embodiment, the documents are automatically extracted from the envelopes. In yet another illustrative embodiment, the intended recipient is sent an identifier used to reference the code and retrieve the imaged document.

DETAILED DESCRIPTION

Figure 1:
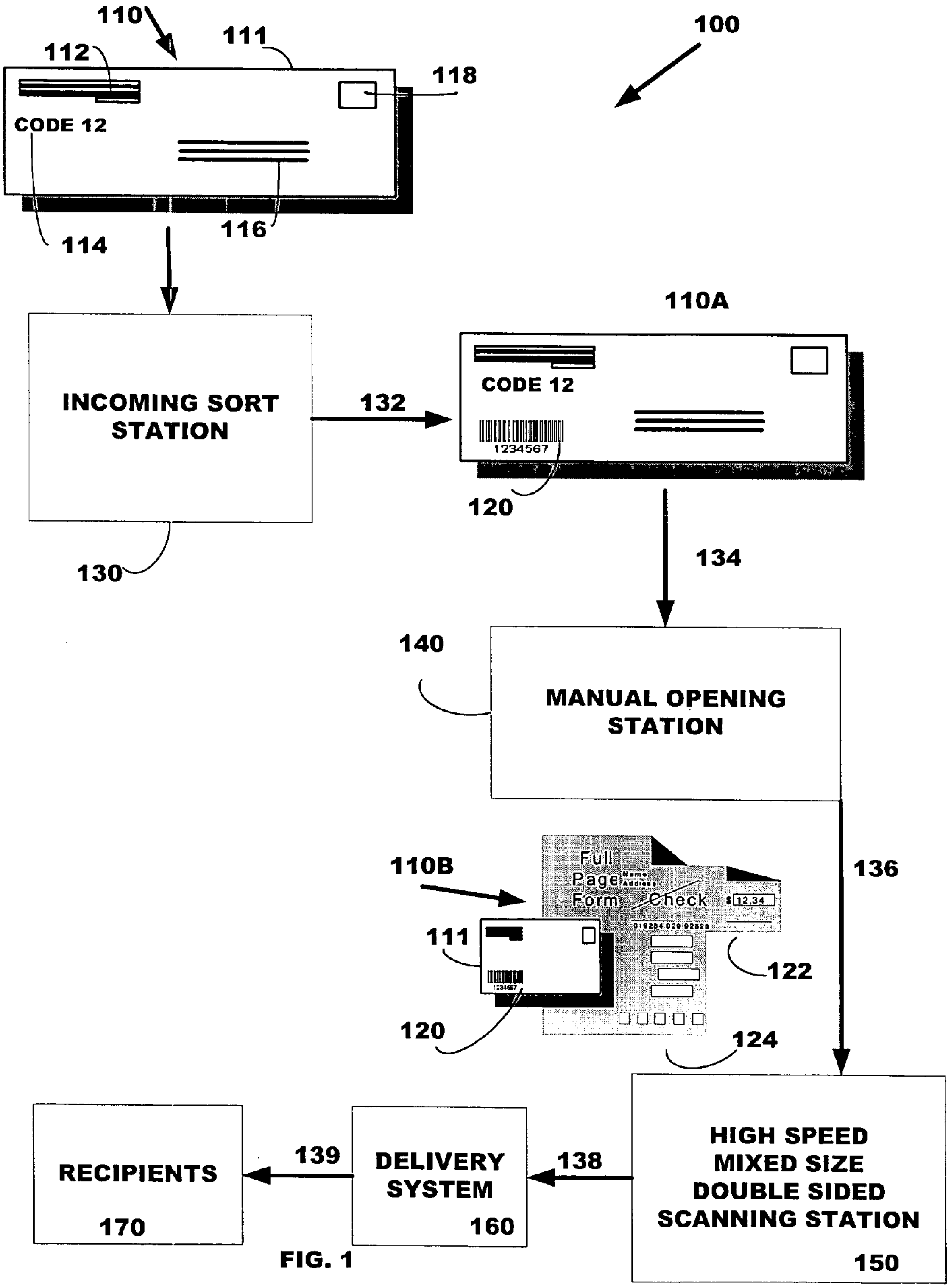
FIG. 1 is a schematic representation of an illustrative system for routing imaged documents according to an illustrative embodiment of the present application.

Illustrative embodiments of a system and method for routing imaged documents are described. The illustrative embodiments are described with reference to an incoming mixed-mail digitized delivery mail solution. However, the embodiments may be applied to other systems as well. The embodiments are described with reference to certain commercially available components. The components may be customized as described and as applied in the context of the particular embodiment. Several alternative components are described in several embodiments. It is understood that the alternative components may be substituted into any of the embodiments as the context of the embodiment allows. Furthermore, the embodiments are understood to encompass the alternative of custom components having the capabilities described herein.

A device for sorting and acquiring image data for documents is described in U.S. Pat. No. 6,311,846 B1 issued Nov. 6, 2001 to Hayduchok, et al. and incorporated herein by reference.

Utilizing conventional imaging technology to archive documents requires a manually intensive job of indexing or routing the document to the appropriate archive file. This effort typically happens after the imaging has occurred and typically relies on human knowledge to make routing decisions. Indexing becomes particularly difficult when a user attempts to convert general "white" correspondence based mail to digital format being routing into a large enterprise of many employees via an email style database. Email style databases are typically subject to frequent change.

It may be advantageous to provide a system having a lower cost method of distributing incoming large enterprise correspondence or white mail digitally. Additionally, it may be advantageous to provide a system that has greater performance, throughput, reliability, or accuracy.

At least certain illustrative embodiments described herein may fulfill the need for an efficient means of converting multi-application or correspondence based mail into a digital format. Such systems may allow an incoming mail user to streamline the incoming mail workflow while making the incoming mail safe from any biohazard contamination and remotely accessible through an email system from any location.

Incoming mail sorters are known including the Olympus II available from Mailcode, Inc. of Lafayette, Ind. The Olympus II sorter includes the ability for multi-line Optical Character recognition (MLOCR) for optically recognizing information from an envelope including destination address and return address information including any other data on the envelope such as an advertisement response code, other identifier or other data that can be checked against a database of expected data. The Olympus II may be configured with dual OCR systems and may process approximately 36,000 pieces per hour. The Olympus II may be configured for Local Video Encoding (LVE) and Remote Video Encoding (RVE) to allow for manual or semiautomatic encoding of mail pieces that could not be fully encoded using the MLOCR system. The system provides for a high degree of automatic recognition of envelopes that may not be available using a scanner after document extraction. A scan of the envelope after document extraction would be particularly problematic if the mail piece used a windowed envelope and the address or other recipient indicating data was no longer available on the envelope after the materials were extracted.

In certain embodiments described herein, an Olympus II sorter may be used to assign a unique identifier to a mail piece such as a number that can be coded into a barcode. The identifier may be printed onto the mail piece directly or printed onto a label that is then affixed to the mail piece. The system may locate available white space on the envelope for the identifier, may place the identifier on either side of the envelope and may even place the label over information on the envelope. Several barcode formats are known and may be utilized including one-dimensional and two-dimensional barcodes. As can be appreciated, the identifier may be locally unique to a company or other subset and may be guaranteed unique over only a short time frame and then reused.

Alternatively, the Olympus II may place a destination identifier on the mail piece that does not include a unique identifier. The code then comprises a bar code or other code representation of the destination identifier (including Arabic numerals) that is used to identify one or more intended recipients.

Alternatively, the incoming mail identifier system may comprise a label printer or other printer for placing an identifier on the envelope so that the envelope may be used as a separator sheet in a scanning process that serially scans mail pieces.

Scanning systems are known such as the high speed, double sided, mixed size capable scanners available from Imaging Business Machines LLC of Birmingham Ala. Additionally, scanning systems are available from the Eastman Kodak Company of Rochester, N.Y. Similarly, such systems may be customized to integrate into a system such as those described herein.

Many email and document workflow systems are known. For example, Lotus Notes and Microsoft Outlook are email systems that may be utilized for many purposes. Additionally, email systems may be customized or created to interface with other automated systems and may be used for notification and imaged document delivery purposes in the embodiments herein. The email systems comprise address books or other recipient address databases that may be used for routing. Similarly, external address databases can be used to pass address data to an email system.

Furthermore, digital document workflow systems such as the OnBase system from Hyland Software, Inc. of Cleveland, Ohio are available to manage digital documents. Such systems may be customized or created to interface with other automated systems and may be used for notification, imaged document delivery and as a repository for purposes in the embodiments herein. Workflow systems may push data to intended recipient or allow a user to pull data from a repository such as by responding to a notification or by periodic polling of the system.

Additionally, automatic envelope openers are known such as the 1250 Automatic Mail Opener available from Pitney Bowes Inc. of Stamford Conn. Incoming mail tracking systems are known such as the Arrival® tracking system available from Pitney Bowes Inc. of Stamford Conn. Manual scanning and routing questionable mail piece handling systems are known such as the ImageAlert™ system available from Pitney Bowes Inc. of Stamford Conn.

Intended recipient and other appropriate recipient data may be maintained in a database or obtained from a database using commercially available database systems including Microsoft SQL or Oracle database.

The components described typically include dedicated processors and workstations that are typically commercially available desktop or laptop workstations that utilize Pentium 4 processors. The dedicated processors may include microprocessors, micro controllers, single board computers or other processors.

Known security methods are used to maintain security including levels of security and access. Known authentication systems are also be utilized. The communications channels are secured using known techniques.

The integrated systems described herein may utilize one or more servers. The server processors may be geographically and load balanced application servers using systems available from Sun Microsystems and the storage servers use multiple location redundant backup systems. The components may be connected using LAN or WAN technology or other communication connections such as a dedicated line. Additionally, other appropriate wireless and wired networks and connections may be utilized. It is contemplated that other communications channels such as OC-3 lines or wireless connections could be used in place of the T1 lines. Similarly, the other communications channels could be replaced with alternatives. As can be appreciated, various communication flows may be utilized, some of which will be chattier than others.

Referring to FIG. 1, a schematic diagram of an illustrative incoming mail scanning and delivery system 100 according to a first embodiment of the present application is shown.

A mail piece 110 is part of a delivery of mail pieces to be processed. The mail piece 110 is representative and is a number 10 envelope 111 with a check 122 and form 124 inside the envelope. Other mail piece may be of different sizes and may include flat envelopes and postcards among other items. The intended recipient address 116 is printed on the envelope along with a return address 112 and a code 114 that may have been preprinted on a business reply mail (BRM) envelope or postcard. The envelope may include a stamp 118 or indicia or permit code.

The mail piece 110 enters the incoming mail sort station 130 that comprises an Olympus II sorter in this embodiment. Alternatively, a label printing system or printer may be used to print identifiers on the mail pieces according to the intended or other appropriate recipient. The sort station 130 recognizes the intended recipient data 116 or other code such as 114 and makes a routing decision. If the system automatically makes the routing decision, it prints code 120. If not, the local or remote video coding system is used in which an operator assist the recognition process. Preferably a routing decision is made when the mail piece is still located at the incoming sort station and a unique identifier is assigned and related code 120 placed on the mail piece envelope 111. The code is preferable a one-dimensional bar code and is preferable at least locally unique over at least a few months for track and trace purposes.

The Olympus II system then has destination information associated with the unique code 120. The unique code is later used to associate the destination information resolved by the Olympus II with the scanned images. The scanned images are associated with the unique ID code using image files and a relational database to associate the image files with the unique code. The back end delivery system then uses the unique code to determine destination data and associate a destination with the scanned document files.

In an alternative, the code merely identifies a recipient. In another alternative, the code 120 is a unique code that is affixed. The mail piece 110A is then fed down stream while the routing decision is being made.

The mail piece 110A now includes code 120 after leaving the sort station on path 132. The physical movement paths may involve a user carrying mail pieces or may be machine operated such as by conveyor belt or other robotic system. Additionally, one or more of the components may be collocated in a single housing using paper handling techniques.

The mail pieces are carried 134 to a manual opening station 140 where the documents are extracted and prepped for scanning with the envelope 111 as a separator sheet. The mail piece 110B is now extracted and carried 136 to the scanner as an envelope 111 with code 120 and a check 122 and form 124. Scanner 150 is a high speed, mixed size, double sided scanning station that scans the documents and uses the envelope to delineate mail pieces. The scanner preferably outputs digital image scans in a common file format such as TIFF or JPEG and preferably stores the mail piece data in a separate file and maintains mail piece identifier information associated with that file. For example, a SQL database is used to associate a scanned unique identifier with file name and locations.

The scanner preferably uses a laser bar code scanner to locate and read the unique ID bar code. Laser based scanners are known such as those used in grocery stores and hand held scanning units. The scanner preferably uses a dual CCD camera scanner for capturing the digitized version of both sides of each separate sheet of the mail piece. Alternatively, the mail piece separator or envelope may also be scanned and included in the digitized version. Alternatively, the scanner may utilize lamp, drum or other optical scanning technologies. Alternatively, the document scanner may be used to scan the unique ID code and recognize the associated sheet or envelope as a separator.

The files are electronically transmitted 138 to a delivery system 160 and then to recipients 170 using communications channel 139. The back end electronic document image system may be an email-based system, workflow based system or other system. In this embodiment, the user is sent the document as an electronic document database link that will maintain the files for one month. The user may log on to retrieve the documents. The user has the option of moving the file before it is purged. In an alternative, the delivery system may use an email system to send a notice of the document availability with a hyperlink to the document. Alternatively, it may send a notice to the user that the system has a new message and invite the user to use the normal password login for a repository system. Additionally, the system may send the imaged document as an email attachment.

Figure 2:
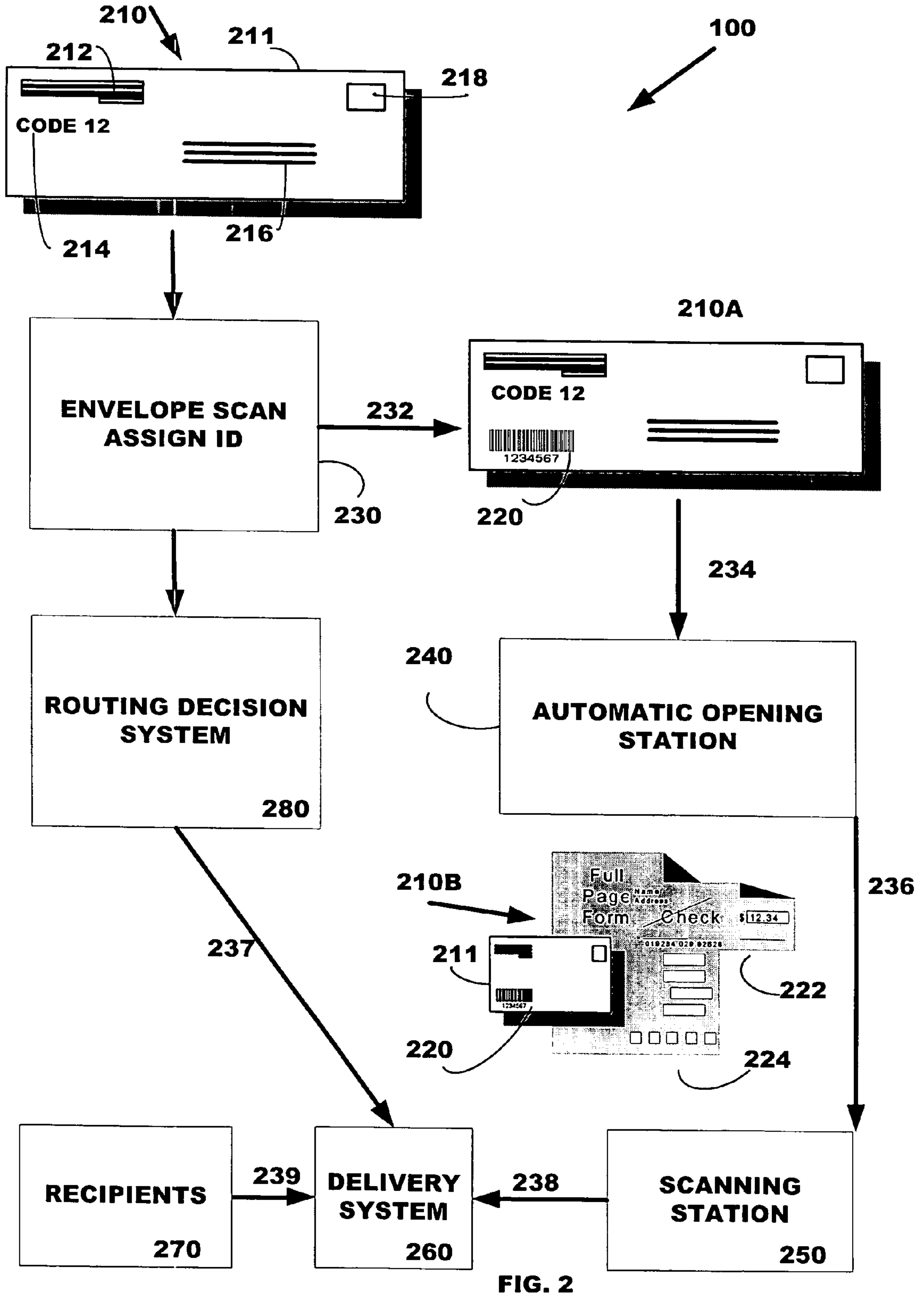
FIG. 2 is a schematic representation of an illustrative system for routing imaged documents according to another illustrative embodiment of the present application.

Referring to FIG. 2, a schematic diagram of an illustrative incoming mail scanning and delivery system 200 according to a second embodiment of the present application is shown.

A mail piece 210 is part of a delivery of mail pieces to be processed. The mail piece 210 is representative and is a number 10 envelope 211 with a check 222 and form 224 inside the envelope. The intended recipient address 216 is printed on the envelope along with a return address 212 and a code 214 that may have been preprinted on a business reply mail envelope. The envelope may include indicia 218.

The mail piece has the envelope scanned 230 and an ID assigned. Then at 232, mail piece 210A with bar code ID 220 is fed to automatic opening station 240 using robotic process 234. The opened mail piece 210B is fed automatically using paper handler 236 to the scanning station 250 that uses the code 220 as a separator sheet. The electronic document image data is sent 238 securely to delivery system 260.

A routing decision system 280 is then used with the envelope scan to determine routing data that is sent securely 237 to the delivery system 260. This decision may be done hours after the mail piece is processed and may utilize remote video encoding across wide areas such as intercontinental electronic transfer. The delivery system 260 is a pull system and recipient client systems 270 periodically poll 239 for available new imaged document data.

Figure 3A:
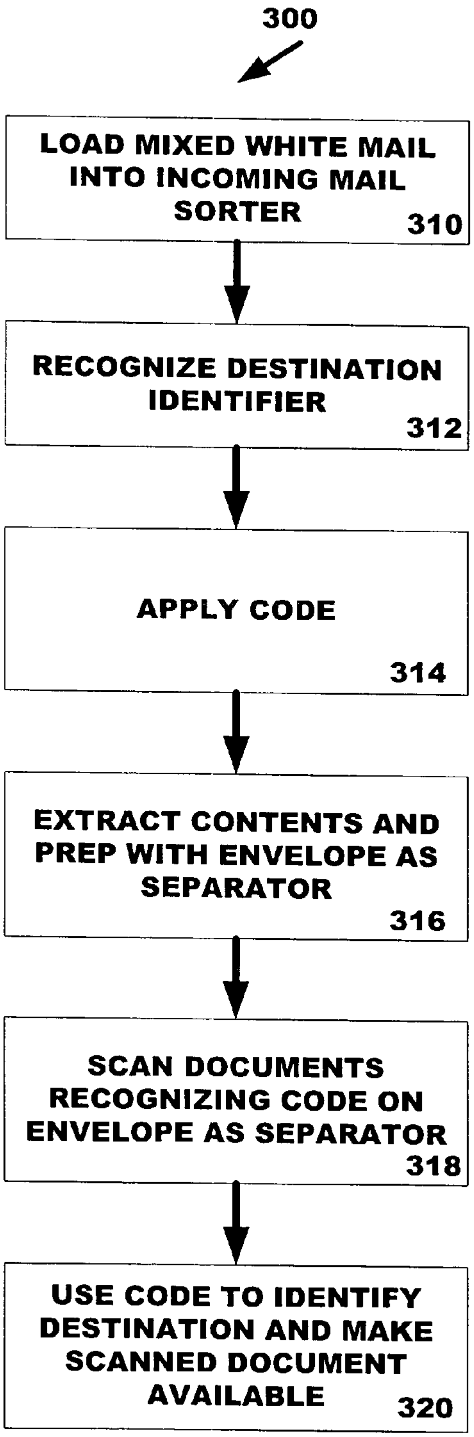
FIG. 3A is a flowchart showing a document image routing process according to an illustrative embodiment of the present application.

Referring to FIG. 3A, a method 300 for processing scanned documents is described according to another illustrative embodiment of the present application.

In step 310, mixed mail is loaded into an incoming mail sorter. In step 312, the sorter recognizes a destination identifier such as an intended recipient name. In step 314, the sorter applies a unique identification code as a bar code on a label that is applied to the mail piece. In step 316, the envelope contents are extracted and prepped using the envelope as a mail piece separator. In step 318, the mail pieces are scanned. In step 320, a delivery system uses the identification code to make the scanned document available to the appropriate recipient or recipients.

In an alternative, the code merely identifies the recipient and the scanning and delivery system use a local file name for temporary identification of the file for delivery. As can be appreciated, the electronic document can be routed to more than one recipient with or without the intended recipients knowledge.

In an alternative, a delivery preference database may be maintained and used for determining whether to electronically or physically route a document. The preference parameter may be user specific, or may be associated with a code on an envelope or a type of document detected.

Figure 3B:
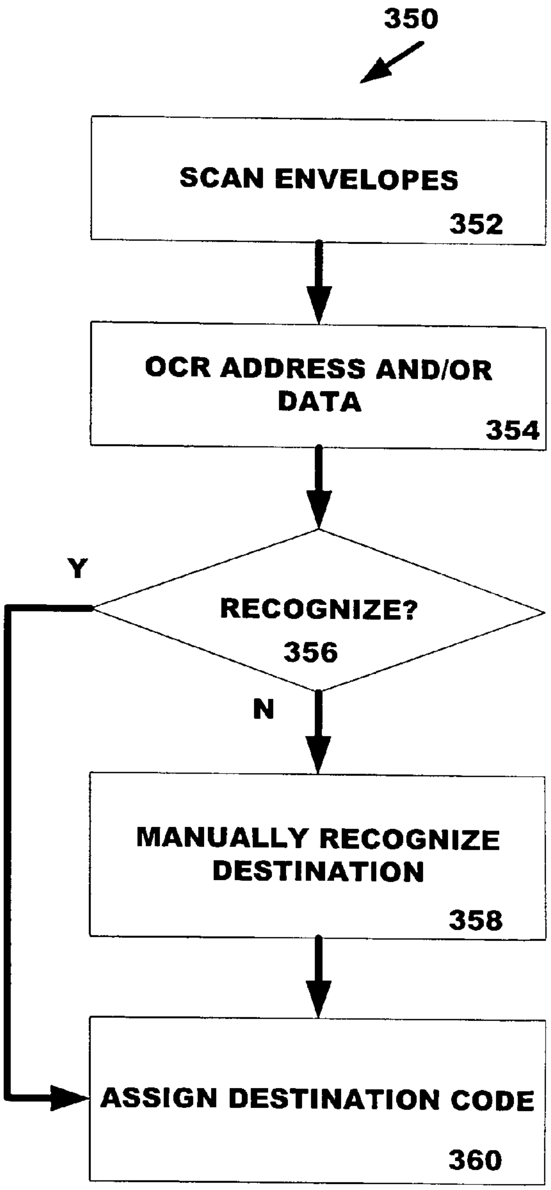
FIG. 3B is a flowchart showing a document image routing process according to an illustrative embodiment of the present application.

Referring to FIG. 3B, a method 350 for routing scanned documents is described according to another illustrative embodiment of the present application.

In step 352, envelope exteriors are imaged using video. In step 354 an automated OCR is attempted on the intended recipient or code data from the envelope. In step 356, if the intended recipient is recognized or other appropriate recipient is recognized, the process proceeds to step 360 to assign a destination code. Otherwise, in step 358, a manual or semiautomatic recognition is utilized and then step 360 is used to apply a destination code.

In an alternative, a second recipient may be determined by the system using information not contained in the mail piece. For example, a quality assurance protocol may route a duplicate copy of every third document to a supervisor as well as the intended recipient. Alternatively, mail may be generically addressed to a department or mail stop such as the customer complaint department and the system may use a round robin or other algorithm to deliver the document to the appropriate party.

Figure 4:
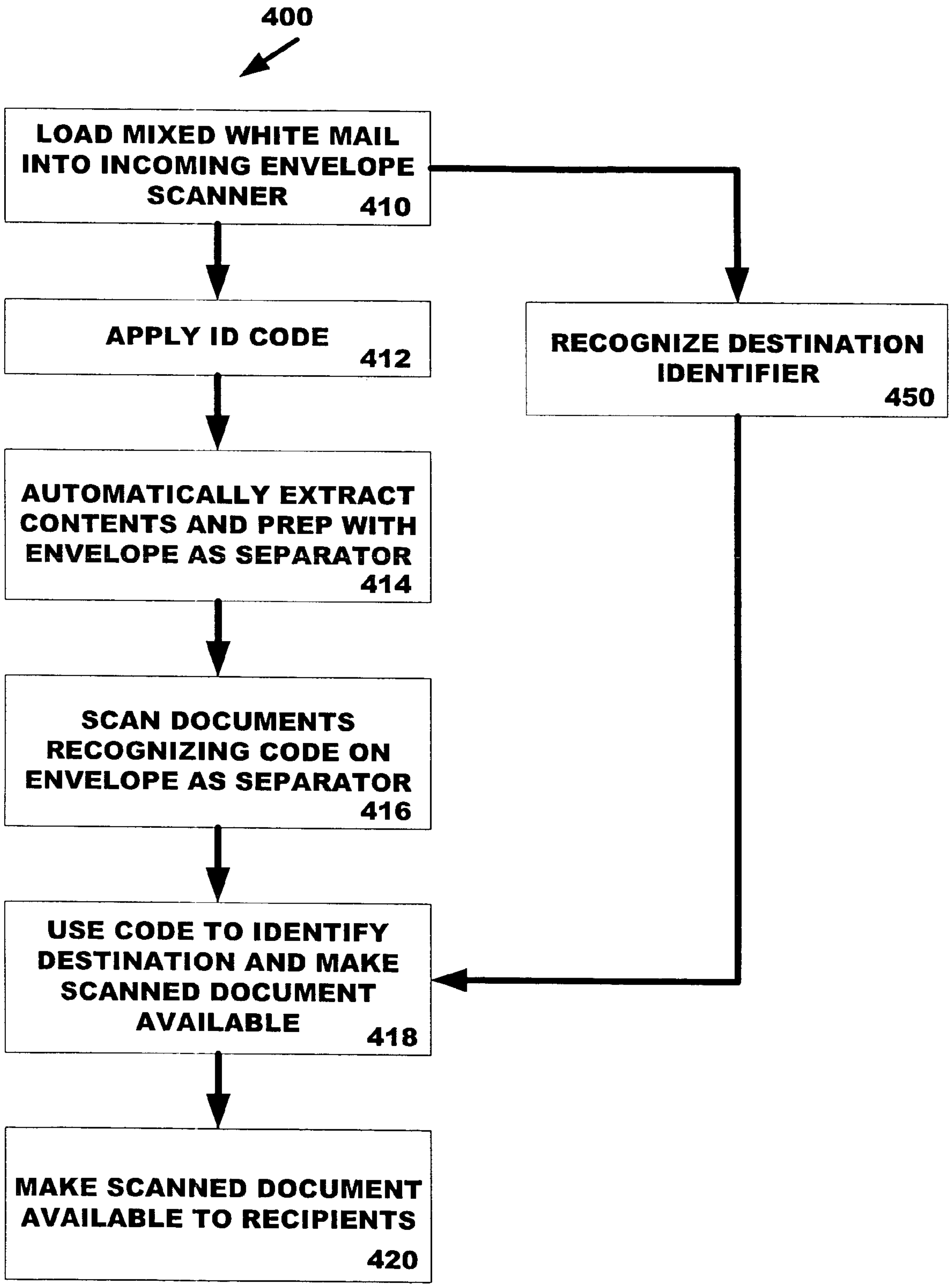
FIG. 4 is a flowchart showing a document image routing process according to an illustrative embodiment of the present application.

Referring to FIG. 4, a method 400 for processing scanned documents is described according to another illustrative embodiment of the present application.

In step 410, mixed mail is loaded into an incoming mail sorter and envelope scanner. In step 412, an ID code is applied to the envelope. In a parallel process, step 450 recognizes the destination identifier in an automatic, semiautomatic or manual process. In step 414, the envelope contents are automatically extracted and prepped using the envelope as a mail piece separator. In step 416, the mail pieces are scanned. In step 418, the system uses the recognized destination to identify the recipient or recipients and decide who to make the documents available to. In step 420, a delivery system makes the scanned document available to the appropriate recipient or recipients.

Additional alternatives are described herein and may be applied to the embodiments. In applications in which the outside of the envelope provides critical information about who must review the particular mail piece (such as by recognizing the return address, recipient address or BRM code), the embodiments described herein rely on the use of the envelope as a header sheet which will provide routing information that eliminates the need for a cumbersome manual indexing process.

An employee or recipient database resides in a host server. The database contains the information of all mail recipients including the designation of potential recipients of the mail pieces that will be converted into a digital format. This information would include the employee and department names, mail stop code, email address, preference of digital or physical delivery among other pertinent data needed to properly identified the delivery point of the mail. A list of customer service associates may be included. A round robin algorithm or other load based algorithm with or without load data feedback or availability feedback may be used to determine recipient data that is external to the mail piece.

The "look up" process is used to identify the recipient person or department of the mail piece and is an automated process that utilizes a mail sorting device or a MLOCR (Mutiline Optical Character Reader) which optically reads the address block and prints a designated barcode ID tag on the outside of the envelope. This tag will uniquely identify this mail piece through the digital conversion process. Additionally, this ID Tagging can be assigned via a workstation and applied to the envelope with a barcode label or other identifying code applicator.

The mail is extracted, prepped, and the enveloped is placed as the top header sheet designating the beginning of the document set. Mail is processed through a high-speed scanner, which utilizes barcode or OCR technology to capture the ID Tag Information Once the high-speed scanner scans all the documents, it creates data of the images and the barcode ID tag that these images are associated with. This data is then exported into a backend email or workflow repository or database. At this point, the unique ID tag information from the scanner is merged with the employee database information that identifies the appropriate routing information assigned to this unique ID tag.

This information, along with the data from the scanned images is exported to a backend email or workflow software system. This data is merged with the host database and matched the ID Tag information with recipient's information. Based on this data the information will be indexed in the workflow or email repository.

The barcode ID tag embodiments described herein are not dependant on a specific technology, but rather provides an automated process for routing mail in the conversion of physical mail to a digital incoming mail environment. The type of databases used may include SQL or Oracle among others and may be customized or selected according to the backend software solution used by the overall company IT department. The database systems may be "off the self" databases or customized or custom programs. Similarly, the system may utilize commercially available computer hardware and operating systems or may use other systems as appropriate for a company.

This Barcode ID Tag embodiment describes a process that automates the routing of mail in a digitized incoming mail environment. The system uses the envelope as a separator sheet and we place a printed Barcode ID Tag on that envelope at the front end of the process via a label printer or a high-speed sorter such as the Olympus II. This ID tag relates uniquely to a specific employee and the designated routing information of this employee. Consequently, there is no need for a manual routing or indexing process.

A "look up process" refers to the need retrieve information from a database table that will identify location information based on certain criteria such as alphabetical, mail stop, department, and unique identifier information among other parameters. There are many different database software solutions commercially available that may be customized.

As an alternative, an enterprise could manually index after the imaging process has occurred. However, such a process will require more manual effort. Furthermore, a user could OCR the envelope after the imaging process, thus eliminating the manual routing task. However, such as system may be problematic because much of white mail is in windowed envelopes. Therefore, the OCR system may be unable to read the address block in the envelope after the document was extracted or find the address block in the many different styles of documents inside the envelope. Additionally, unreadable addresses by the OCR would require extensive search through all the documents to find the address piece.

In an alternative, the digital image of the mail piece document is converted for delivery. For example, a scanned TIFF or JPEG document may be converted into a PDF format for delivery. Similarly, any of BMP, GIF, and PNG formats may be used.

The present application describes illustrative embodiments of a system and method for routing imaged documents and in at least one embodiment describes a system and method for automatically processing incoming mail including identifying an intended or other appropriate recipient and assigning an identifier to a mail piece which is then scanned and routed digitally according to the automatic or semiautomatic recognition system. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed is:

1. A method for routing images of documents comprising:

receiving a mail piece having an envelope comprising a code apart from an intended recipient address field;

removing mail piece contents from the envelope;

feeding the mail piece contents and the envelope and at least one other document having second mail piece contents and a second envelope, all separately and serially to a digital imaging device in a serial stream;

obtaining a digital representation of mail piece contents using the digital imaging device, wherein the code is scanned and used as a document separator sheet to determine how to separate the mail piece contents from the second mail piece contents from the at least one other document in the serial stream; and then routing the digital representation of the mail piece contents using the code.

2. The method of claim 1, wherein:

the code comprises a identifier assigned using an incoming mail sorter.

3. The method of claim 2, wherein:

the identifier is at least locally unique to the mail piece.

4. The method of claim 3, wherein:

the incoming mail sorter uses an automatic OCR process to recognize at least one intended recipient associated with the unique identifier.

5. The method of claim 3, wherein:

the incoming mail sorter uses an semi-automatic video encoding process to assign at least one intended recipient associated with the unique identifier.

6. The method of claim 3, wherein:

the incoming mail sorter uses a remote video encoding process to assign at least one intended recipient associated with the unique identifier.

7. The method of claim 1, wherein:

the code comprises an identifier associated with at least two recipients.

8. The method of claim 1, wherein:

the code comprises an identifier associated with at least one other appropriate recipient that is not identified on the mail piece as an intended recipient.

9. The method of claim 1, further comprising:

using the code and external routing data to route the digital representation of the mail piece contents.

10. The method of claim 9, wherein:

the external routing data is determined using a round robin algorithm.

11. The method of claim 1, wherein:

the digital representation comprises a file in a format selected from the group consisting of TIFF, JPEG, BMP, GIF, and PNG.

12. The method of claim 1, wherein:

the digital representation comprises a file in a compressed format.

13. A method for routing a plurality of scanned images of documents received in a corresponding plurality of mail piece pieces including a first scanned image of documents received in a first mail piece and a second scanned image of documents received in a second mail piece wherein each of the plurality of mail pieces includes a respective envelope that encloses the documents when they are received comprising:

assigning a unique identifier to each of the plurality of mail pieces;

marking the respective unique identifier on the respective envelope of the respective mail piece apart from an intended recipient address field;

recognizing at least one respective recipient associated with each of the plurality of mail pieces using an automated recipient recognition system;

receiving a stack including separately, the respective first envelope, the documents received in the first mail piece that have been removed from the first envelope, the respective second envelope having a second respective unique identifier on the respective second envelope, and the documents received in the second mail piece that have been removed from the second envelope;

obtaining the scanned images of documents received in the first mail piece and the scanned images of documents received in the second mail piece using the respective second unique identifier on the second envelope as a document separator sheet to determine how to separate the scanned images of documents received in the first mail piece and the scanned images of documents received in the second mail piece, and delivering the plurality of scanned images of documents to the respective at least one recipient using the respective unique identifier.

14. The method of claim 13, wherein for each mail piece:

the respective at least one recipient is an intended recipient; and wherein the respective identifier is marked on the respective envelope by printing the respective identifier on a respective label and attaching the respective label to the respective envelope.

15. The method of claim 13, wherein for each mail piece:

the respective at least one recipient comprises a recipient determined using data external to the mail piece.

16. A method for routing images a digital representation of documents in a mail piece wherein the mail piece includes an envelope containing the documents when the mail piece is received comprising:

identifying a unique identifier on the envelope apart from an intended recipient address field;

recognizing an intended recipient using the unique identifier;

receiving a stack including, separately, the envelope and the documents that have been removed from the envelope and for obtaining the digital representation of the documents in a mail piece using the identifier as a separator sheet to determine how to separate the documents from a second mail piece in the stack; and routing the digital representation of the documents using the identifier.

17. The method of claim 16, wherein:

the unique identifier is coded in a barcode.

18. The method of claim 17, further comprising:

printing the unique identifier on the mail piece.

19. The method of claim 16, wherein:

the intended recipient comprises a recipient determined using data external to the mail piece.

20. The method of claim 16, wherein:

the intended recipient comprises a supervisor associated with an addressed recipient.

* * * * *